(12) United States Patent
Warrier et al.

(10) Patent No.: US 7,096,495 B1
(45) Date of Patent: Aug. 22, 2006

(54) NETWORK SESSION MANAGEMENT

(75) Inventors: Ulhas S. Warrier, Beaverton, OR (US);
Prakash Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,928

(22) Filed: Mar. 31, 2000

(51) Int. Cl.
*G06F 21/00* (2006.01)

(52) U.S. Cl. .......................... 726/15; 726/14; 709/224

(58) Field of Classification Search ........ 709/200–250; 713/150–250; 714/39, 47; 726/15, 14
See application file for complete search history.

(56) References Cited

U.S. PATENT DOCUMENTS

| | | | | |
|---|---|---|---|---|
| 5,987,611 A | * | 11/1999 | Freund | 726/4 |
| 6,003,084 A | * | 12/1999 | Green et al. | 709/227 |
| 6,219,786 B1 | * | 4/2001 | Cunningham et al. | 713/152 |
| 6,453,345 B1 | * | 9/2002 | Trcka et al. | 709/224 |
| 6,453,419 B1 | * | 9/2002 | Flint et al. | 713/201 |
| 6,466,984 B1 | * | 10/2002 | Naveh et al. | 709/227 |
| 6,539,483 B1 | * | 3/2003 | Harrison et al. | 713/201 |
| 6,678,827 B1 | * | 1/2004 | Rothermel et al. | 713/201 |
| 6,701,437 B1 | * | 3/2004 | Hoke et al. | 726/15 |

\* cited by examiner

*Primary Examiner*—Jacques H. Louis-Jacques
*Assistant Examiner*—Ellen C. Tran
(74) *Attorney, Agent, or Firm*—Fish & Richardson P.C.

(57) ABSTRACT

This invention uses network stack information to enforce context-based policies. The combination of policies, user/application context information and packet filtering is used to enable fine-grained control of network resources.

25 Claims, 4 Drawing Sheets

NETWORK SESSION MANAGEMENT

This invention relates to network session management.

BACKGROUND

A virtual private network (VPN) is a data service that offers transmission characteristics similar to those of private lines using the public Internet. Remote access VPNs can be used for accessing corporate local area networks (LANs) over public networks from small office home offices (SOHO) where employees of the corporations can work from home. The rise of security technologies such as IPSEC, a secure form of the Internet Protocol with optional authentication and encryption, as well as improved quality of service (QoS) has made VPN applications practical. At the same time, the rise in high-speed communication lines such as asymmetric digital subscriber lines (ADSL) and cable modems has increased the vulnerability of the VPNs because they provide conduits for hackers on the public Internet to access sensitive information on a corporate network during a VPN session.

IT administrators can impose restrictions on network access privileges of the remote system to the corporate LAN during a VPN session. For example, during a VPN session between a SOHO and a corporate LAN, the home gateway between the SOHO and the LAN might allow the client access to the printer at home but not to the public Internet. In many situations the home office user may wish to re-configure the network resources based on policies delivered from the LAN. VPN clients are not typically home-networking aware and consequently may limit home network usage during VPN sessions. Personal computer (PC) firewalls are configurable, but are not well integrated with VPN clients and cannot enforce dynamic network stack reconfiguration based on policies.

DETAILED DESCRIPTION

Figure 1:
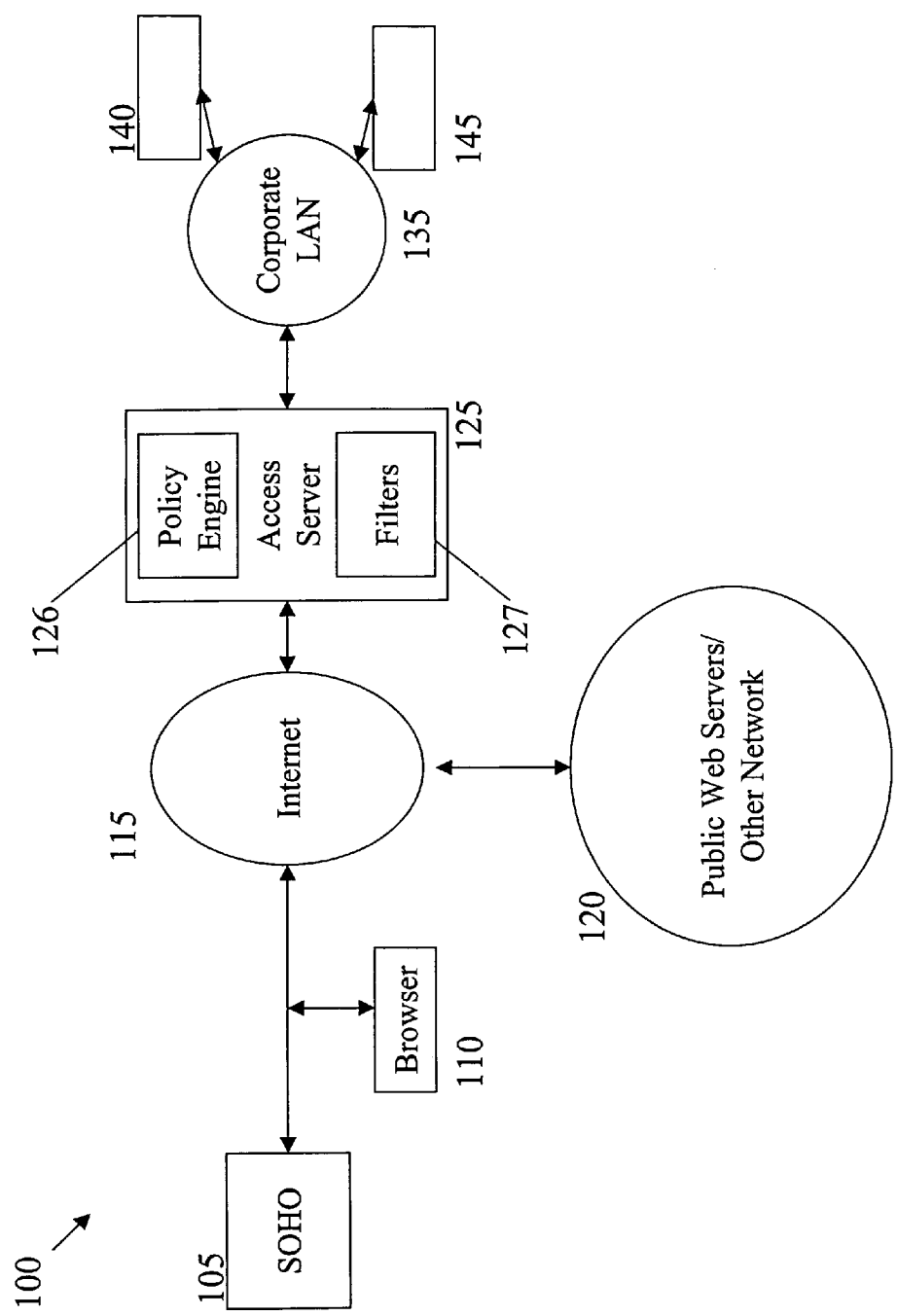
FIG. 1 illustrates a transaction system.

As shown in FIG. 1, a transaction system 100 allows for transactions between a home office and a corporation. A client station such as a SOHO 105 can use a browser 110 or other network software to initiate a network transaction. The SOHO 105 uses its network software to connect to the Internet 115. The SOHO 105 can connect to Public Web Servers on Internet/Other network 120 or can initiate a VPN session with a corporate LAN 135 through this connection with the Internet 115 and through the corporate Access server 125. The corporate LAN 135 can be, for example, a local network or expanded network of computers in a single location or a national or even international location. When the SOHO 105 initiates the VPN session, it is connected with other computers associated with the corporate LAN 135 (based on policies set for corporate LAN 135. Various devices 140, 145 are connected to the corporate LAN 135 for access from other devices on the LAN or a SOHO/remote device 105.

The corporate Access server 125 can include a policy engine 126 having a list of policies that grant privileges to a variety of users. The policy engine 126 is used to create filters 127 that permit or deny users access to the devices 140, 145 on the corporate LAN 135.

Figure 2:
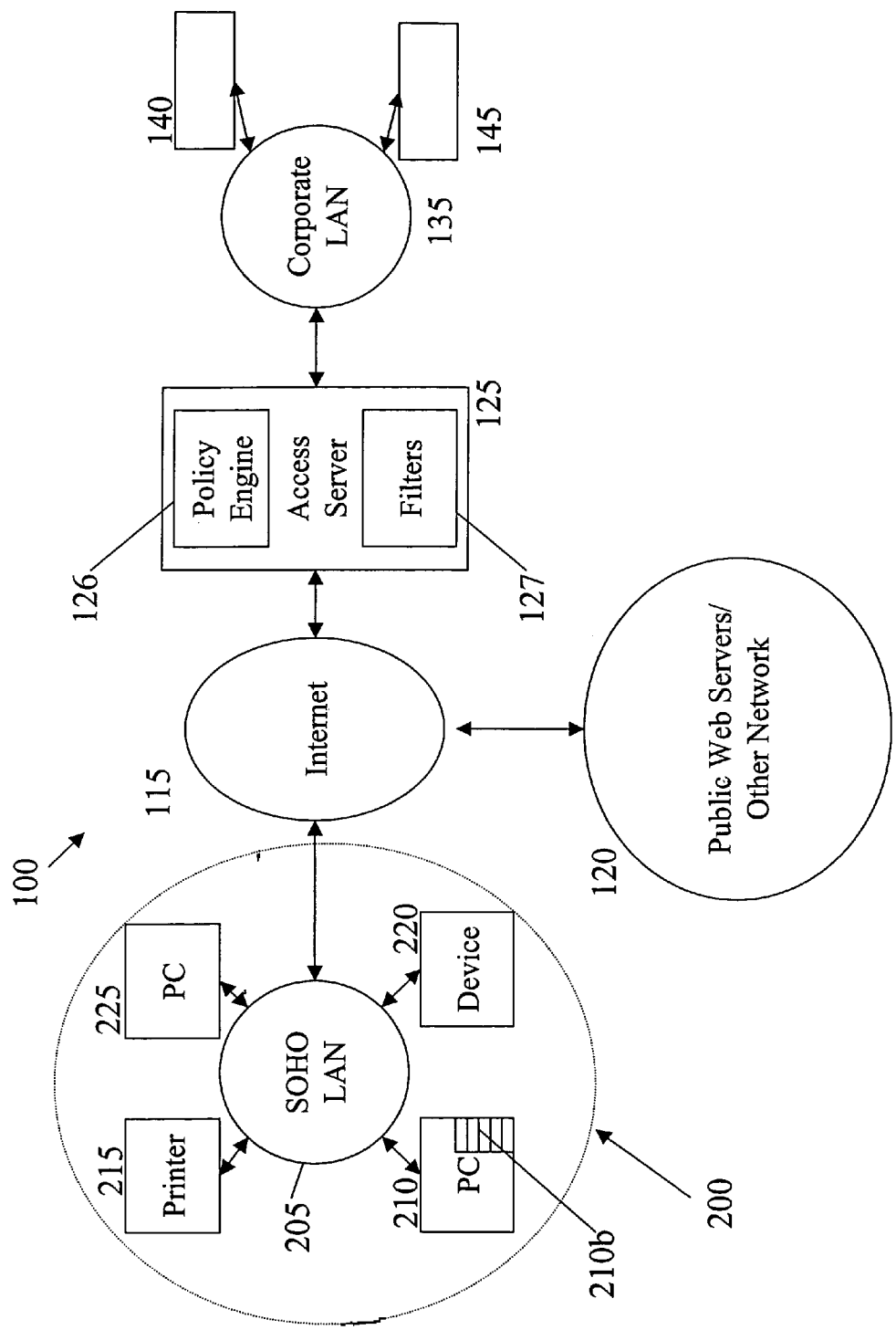
FIG. 2 illustrates a transaction system with a small home office local area network.

FIG. 2 illustrates the system 100 of FIG. 1 with an expanded view of the SOHO 105 as a network 200. A SOHO LAN 205 can have several attached devices including a PC 210 that initiates a VPN session, a printer 215 and other devices 220. During a VPN session, the device that initiated the VPN session also can function as a node in the SOHO network 200. For example, in a typical SOHO network 200, the VPN device 210 can perform the role of a gateway. Other devices such as the PC 225 can access services available on the VPN PC 210, or the VPN PC 210 can access printer 215 or other devices 220 on the SOHO network 200.

Sharing the SOHO network 200, however, should not compromise the security of the corporate LAN 135. Other PCs such as the PC 225 should be able to access the corporate LAN 135 through the VPN PC 210. Conversely, other devices 140, 145 on the corporate LAN 135 should not be able to access PCs on the SOHO network 200. If the VPN PC 210 is also the gateway, then other PCs on the SOHO network such as PC 225 should be able to access Public servers or other network 120 without compromising security of the SOHO network 200 or the corporate LAN 135 or any device associated with the VPN session. However, any nodes on the Internet 120, that is, any unauthorized users, should not able to access any of the services on the VPN PC 210 during the VPN session. Any such access would be a breach of security of the VPN session and must be avoided.

To enhance the security of the system, the VPN PC 210 has a network stack component 210b. The network stack component 210b includes data storage locations typically accessed in a sequential manner, and defines the parameters of the VPN session. To provide the security and access parameters discussed above, the network stack is dynamically reconfigured during the VPN session. Reconfiguration can be statically pre-determined or can be dynamically controlled by policies downloaded by the VPN PC 210 from 126 during the VPN session setup. Policies can be fine-grained or coarse-grained. A fine-grained policy can be, for example, a rule that creates a very narrowly defined filter to control the data flow on a specific network interface. A course-grained policy can, for example, be a rule that creates a more broadly defined filter to control the data flow on a larger class or type of network interface.

Figure 3:
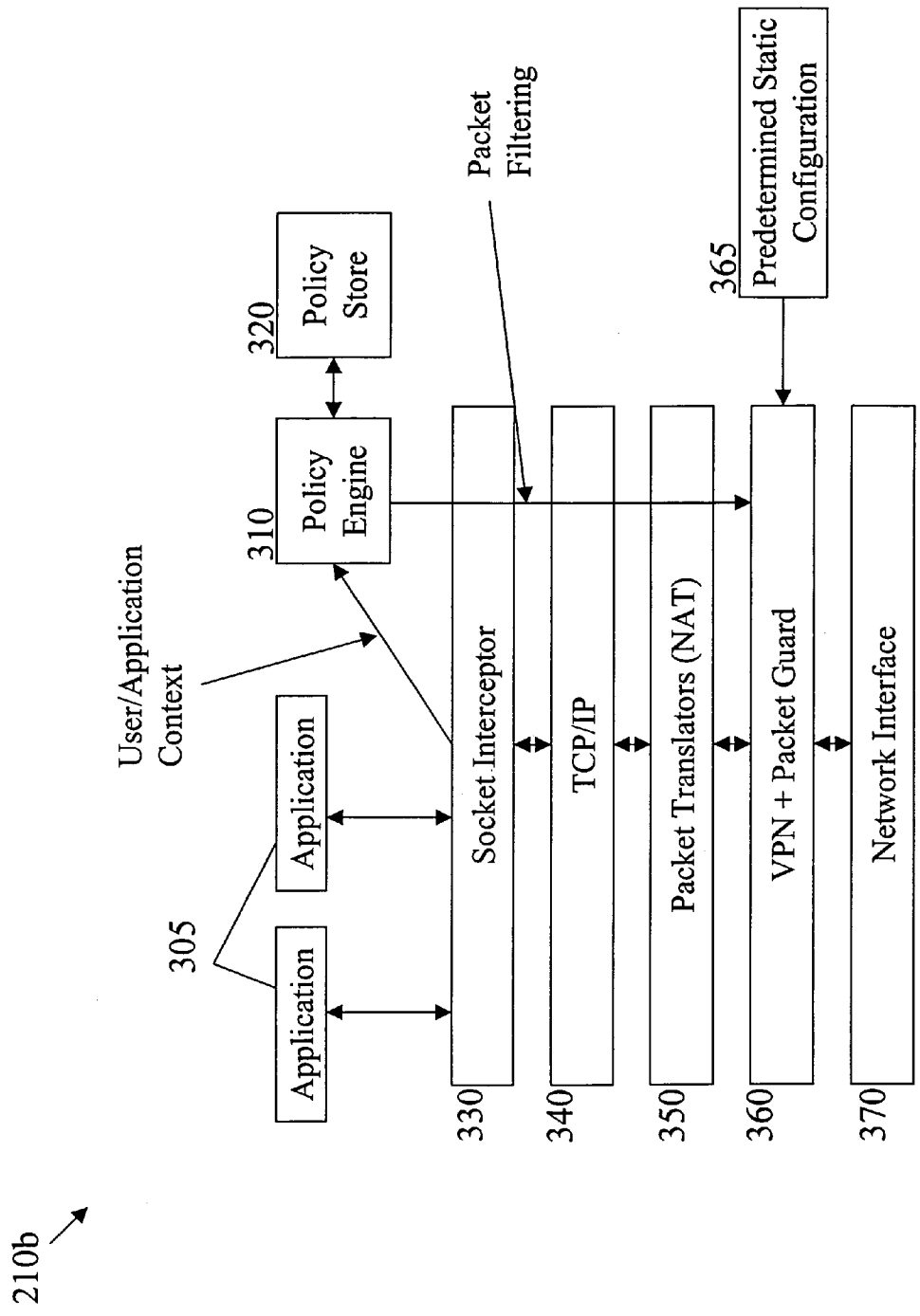
FIG. 3 illustrates an embodiment of a network stack.

FIG. 3 illustrates an embodiment of a network stack 210b that can be reconfigured during a VPN session. The VPN PC 210 can have a number of applications running on it such as applications 305. A policy store 320 serves as a repository for policies from the policy engine 126 that are updated by retrieving policies from the Access server 125 each time a VPN session is initiated. An augmented policy engine 310 is an extension of the policy engine 126 on the Access server 125. The augmented policy engine 310 uses policy rules from the policy store 320 and applies the rules to both application context priorities as well as data traffic over the network. For example, a policy rule may allow a particular word processing application on the VPN PC 210 to access a document located on the device 140 on the corporate LAN 135. The word processing program also has associated with it an application context that determines its priority in accessing the device 140. Furthermore, policy rules may apply to the network data traffic. Network flow is tracked using various factors such as the type of flow (local or remote origination), network interfaces, destination network address, and source (application, user etc.). The augmented policy engine 310 uses the application context along with the network data flow factors to enforce finer-grained packet filtering based on the policy rules in the policy store 320. In this example, the word processing application may be limited not only by the policy rule, but also by its application context and the network data traffic. The finer granularity of control prevents unwanted outsiders from accessing the VPN session. The network stack 210b stores the address space of the LAN 205 to allow the stack 210b to distinguish between devices on the SOHO LAN 205 and devices on the corporate LAN 135, and undesired nodes on the Internet or other network 120. The network stack 210b is thus able to filter packets based on the source and destination.

A socket interceptor 330 serves as a session layer component in the network stack 210b that identifies all active network applications 305. The Portable Operating System Interface UNIX (POSIX) is used to create application sockets and provide a uniform application interface. In one embodiment, the socket interceptor drops packets destined to and from certain applications 305. For example, the socket interceptor drops packets from user logins that are not authorized to be part of a VPN session. In another embodiment, the socket interceptor 330 provides context information for network packets flowing from a packet guard 360 that creates packet filters as they flow into the packet guard. In one embodiment, the socket interceptor can be implemented as a WinSock layered service provider (LSP) on a Microsoft Windows platform. In this way, the socket interceptor 330 acts as an application program interface (API) between Microsoft Windows and TCP/IP protocol software.

In addition to receiving context information from the socket interceptor 330, the packet guard 360 also creates filters from the policies in the policy store 320. The packet guard 360 also can be connected to a predetermined static configuration 365 that also provides filtering criteria. "Instance" filtering is dictated by the augmented policy engine 310 based on rules in the policy store 320. In one embodiment, the packet guard layer 360 can be implemented as a Network Driver Interface Specification (NDIS) intermediate driver on the Microsoft Windows platform. In this way the packet guard 360 can offer protocol multiplexing so that multiple protocol stacks can co-exist on the same host.

A Transmission Control/Internet Protocol (TCP/IP) layer that provides the network communication is connected between the socket interceptor 330 and the packet guard 360. A packet translator 350 is connected between the TCP/IP interface 340 and the packet guard layer 360. The packet translator 350 translates data packets to and from the different network locations, in this case, the packets between the corporate LAN 135 and the SOHO LAN 205. In one implementation, the packet translator can be the Internet standard Network Address Translation (NAT) that allows a company to shield internal addresses from the Internet.

A network interface 370 is connected to the packet guard 360. The network interface is the session layer that interfaces the network stack 210b with network software (not shown) to connect the VPN PC 210 to the SOHO LAN 205 and ultimately to the corporate LAN 135.

The network stack 210b thus creates an effective "firewall" between the VPN session and outside intrusion.

Figure 4:
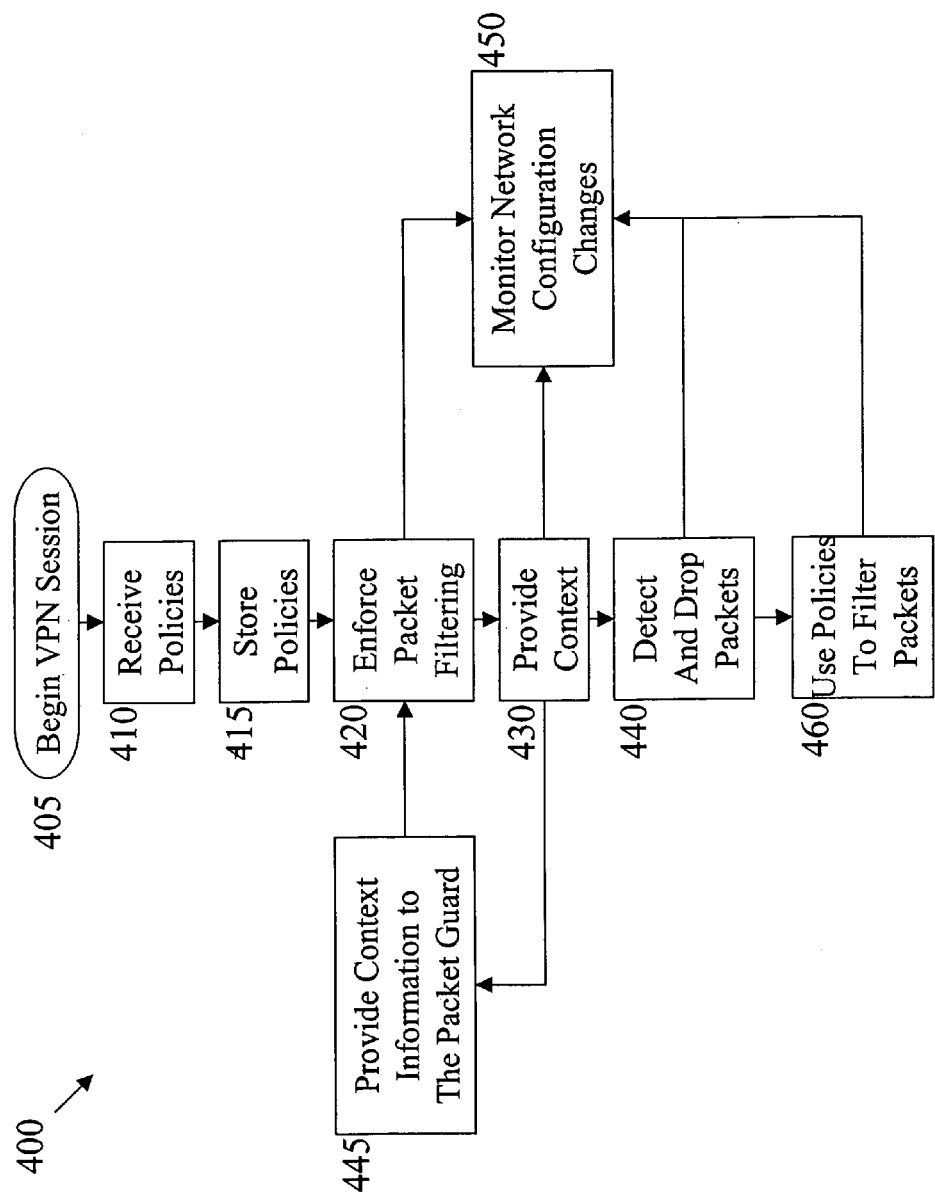
FIG. 4 is a flow chart of a method of dynamically reconfiguring a network stack during a VPN session.

To reconfigure the network stack 210b securely and automatically during the VPN session, the network stack 210b senses the VPN session. As shown in FIG. 4, a client begins 405 a VPN session. The network stack 210b receives 410 policies from the Access server 125 and stores 415 the policies in the policy store 320. At this point, the VPN session initially is sensed and the received policies determine what access the client, the SOHO 105 or the SOHO LAN 205, is permitted. The packet guard 360 is used to enforce 420 packet filtering. The packet filtering is performed either by receiving policy rules from the augmented policy engine 310 or by reading the pre-programmed static configuration 365 that determines what packets are filtered. Next, the socket interceptor 330 is created and provides 430 user and/or application context. The socket interceptor 330 can detect and drop 440 packets, for example, from user logins that are not permitted to be part of the VPN session. Packets from any other external PCs (not shown) also are dropped. The socket interceptor 330 also can provide 445 application context information back to the augmented policy engine 320 about applications 305. This context information can be used by the augmented policy engine 310 to further enforce 420 packet filtering. Furthermore, the policies are used to filter 460 packets. Therefore, the network stack 210b is constantly re-configuring itself based on policy rules received from the Access Server 125 and context information provided by the socket interceptor 330 and from the packet guard, which serves as a "packet firewall". The process 400 constantly monitors 450 network configuration changes throughout the VPN session to detect any external intervening and unauthorized processes.

Various aspects of the apparatus and methods may be implemented in digital circuitry, or in computer hardware, firmware, software, or in combinations of them. Apparatus can be implemented in a computer products tangibly embodied in a machine-readable storage device for execution by a programmable processor. The foregoing techniques may be performed, for example, by a programmable processor executing a program of instructions to perform functions of the invention by operating on input data and generating output. The methods can be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language. The language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

Possible advantages of the foregoing techniques include dynamic creation of a packet filtering firewall (the packet guard 360), which is driven by policies or static configurations. Another advantage is the ability to extend policies to include application and/or user context. For example, a corporate policy may temporarily ban the use of a particular browser until patches are applied. Correlating application context and network packet flows can easily enforce such a policy. Another advantage is the ability to confirm continuously that security policies are being applied on the client side.

The foregoing method also can use unified network stack information to enforce the context-based policies. The stack is an aggregation of information across the various layers of the network stack. The combination of application and/or user context to network flow enables the fine-grained control of the network resources in the home office.

Other embodiments are within the scope of the following claims.

What is claimed is:

1. A network system, comprising:
   first and second devices, wherein
      the first device is adapted to:
         deliver a set of policies to the second device during initialization of a virtual private network between the first and second devices; and
      the second device is remote from the first device and adapted to:
         run an application;
         use both said policies and a priority assigned to the application to detect data packets from unauthorized activities; and
         reject data packets from the unauthorized activities.

2. The system of claim 1 further comprising a network stack.

3. The system of claim 2, wherein the network stack comprises:
   a policy engine connected to the first device;
   a policy store connected to the policy engine;
   a socket interceptor connected to the policy engine; and
   a packet guard connected to the policy engine.

4. The system of claim 1, the first device further comprising instructions to monitor the system for the intervening processes.

5. A network stack, comprising:
   a policy engine;
   a policy store adapted to interact with the policy engine and store a set of policies from the policy engine;
   a socket interceptor coupled to the policy engine;
   a packet guard coupled to the policy engine;
   a configurable management process adapted to reconfigure the network stack and having instructions to:
      receive policies in the policy engine from the policy server during a virtual private network session with a remote device;
      use the socket interceptor to detect and reject data packets from unauthorized users and applications and provide the packet guard with context information about the unauthorized users and applications including at least information about a running state of the application;
      use the packet guard to filter unauthorized activities received from the network interface;
      use the packet guard to filter the data packets from unauthorized users and applications based on the context information received by the socket interceptor; and
      use the packet guard to filter data packets based on the policies.

6. The network stack of claim 5 further comprising a packet translator adapted to interact with the socket interceptor and the packet guard.

7. The network stack of claim 5 further comprising an interface to a network adapted to connect the network stack to the network, wherein the network has a policy server.

8. A system as in claim 1, wherein said second device uses said policies to determine if an application is running and allows certain kinds of network packets, associated with said network application, to pass only when said application is running and to be blocked when said application is not running.

9. A method comprising:
   establishing a virtual private network (VPN) session between a primary computing system and a remote computing system, wherein the primary computing system includes a security policy engine, and wherein the remote computing system includes a network stack;
   transmitting information indicative of security parameters from the primary computing system to the remote computing system using the security policy engine during initialization of the VPN;
   configuring the network stack based on the information indicative of security parameters;
   subsequently running a particular application program on the remote computing system;
   selecting information indicative of updated security parameters based on a priority of the particular application program; and
   dynamically reconfiguring the network stack based on the information indicative of the updated security parameters.

10. The method of claim 9, wherein the primary computing system is a corporate local area network (LAN).

11. The method of claim 9, wherein the remote primary computing system is a remote home network.

12. The method of claim 9, wherein the particular application program is a data processing program, and wherein, when a running state of the data processing program indicates that the data processing program is not running, the information indicative of security parameters causes the remote computing system to block packets received at the remote computing system.

13. The method of claim 9, wherein the particular application program is a data word processing program, and wherein, when a running state of the data processing program indicates that the data processing program is running, the information indicative of updated security parameters causes the remote computing system to not block packets received at the remote computing system.

14. A method comprising:
   establishing a secure virtual private network connection between a server and a remote system;
   delivering security policies from the server to the remote system during initialization of the secure private network connection; and
   regulating access to nodes accessible via the server by the remote system based on the security policies and a priority associated with at least one application program running on the remote system.

15. The method of claim 14 wherein regulating access comprises providing filters that are adapted to reject unauthorized data packets based on rejection criteria that are conditioned on the security policies and the priority of the at least one application program.

16. The method of claim 14 wherein regulating access comprises:
   providing a session layer adapted to reject unauthorized data packets based on context information; and
   providing filters adapted to reject unauthorized data packets based on rejection criteria from at least one of the context information and the policies.

17. The method of claim 14 further comprising updating the set of policies.

18. The method as in claim 14, wherein the remote system includes a network stack, and wherein the regulating access comprises reconfiguring the network stack to control filtering of network packets, based on the policies and the priority of the application.

19. The method as in claim 14, wherein the policies include information about authorized kinds of information when certain applications are running, and regulating access comprises determining if a specified application is running, allowing a specified kind of network packet to pass only when the specified application is running, and blocking the specified kind of network packet from passing when the specified application is not running.

20. The method as in claim 19, wherein the specified application is a word processing program, and the kind of network packet is word processing data.

21. An article comprising a computer-readable medium which stores computer-executable instructions, the instructions causing a computer to:
   establish a secure virtual private network connection between a server and a remote system;
   deliver security policies from the server to the remote system during initialization of the secure private network connection; and
   regulate access to nodes accessible via the server by the remote system based on the security policies and a priority associated with at least one application program running on the remote system.

22. The article of claim 21 wherein regulating access comprises providing filters that are adapted to reject unauthorized data packets based on rejection criteria that are conditioned on the security policies and the priority of the at least one application program.

23. The article of claim 21 wherein regulating access comprises:
   providing a session layer adapted to reject unauthorized data packets based on context information; and
   providing filters adapted to reject unauthorized data packets based on rejection criteria from at least one of the context information and the policies.

24. The article of claim 21 further comprising updating the set of policies.

25. The article as in claim 21, wherein the policies include information about authorized kinds of information when certain applications are running, and regulating access comprises determining if a specified application is running, and allowing a specified kind of network packet to pass only when the specified application is running, based on the policies, and, blocking the specified kind of network packet from passing, when the specified application is not running, based on the policies.

* * * * *